(12) United States Patent
Xie et al.

(10) Patent No.: US 10,059,845 B2
(45) Date of Patent: Aug. 28, 2018

(54) METHOD FOR PREPARING PEARLESCENT PIGMENT FROM ILMENITE HYDROCHLORIC ACID ACIDOLYSIS SOLUTION BY CO-EXTRACTION

(71) Applicant: Fujian Kuncai Material Technology Co., Ltd., Fuqing (CN)

(72) Inventors: Bingkun Xie, Fuqing (CN); Zhicheng Cao, Fuqing (CN); Ming Fei, Fuqing (CN); Jiwei Chen, Fuqing (CN)

(73) Assignee: Fujian Kuncai Material Technology Co., Ltd. (CN)

( * ) Notice: Subject to any disclaimer, the term of this patent is extended or adjusted under 35 U.S.C. 154(b) by 0 days.

(21) Appl. No.: 15/508,792

(22) PCT Filed: Jan. 6, 2015

(86) PCT No.: PCT/CN2015/070228
§ 371 (c)(1),
(2) Date: Mar. 3, 2017

(87) PCT Pub. No.: WO2016/037455
PCT Pub. Date: Mar. 17, 2016

(65) Prior Publication Data
US 2017/0275470 A1    Sep. 28, 2017

(30) Foreign Application Priority Data
Sep. 11, 2014   (CN) .......................... 2014 1 0460330

(51) Int. Cl.
| | |
|---|---|
| C09C 1/24 | (2006.01) |
| C09C 1/36 | (2006.01) |
| C09C 1/00 | (2006.01) |
| C09D 5/36 | (2006.01) |
| C09D 17/00 | (2006.01) |
| C09D 11/50 | (2014.01) |
| C09D 11/037 | (2014.01) |
| D06P 3/32 | (2006.01) |
| D06P 1/673 | (2006.01) |

(52) U.S. Cl.
CPC .......... *C09C 1/0015* (2013.01); *C09C 1/0009* (2013.01); *C09C 1/24* (2013.01); *C09C 1/36* (2013.01); *C09C 1/3607* (2013.01); *C09D 5/36* (2013.01); *C09D 11/037* (2013.01); *C09D 11/50* (2013.01); *C09D 17/007* (2013.01); *C09D 17/008* (2013.01); *D06P 1/673* (2013.01); *D06P 1/67383* (2013.01); *D06P 3/32* (2013.01); *C01P 2004/82* (2013.01); *C01P 2006/60* (2013.01)

(58) Field of Classification Search
CPC ....... C09C 1/0015; C09C 1/0009; C09C 1/24; C09C 1/36; C09C 1/3607; C09D 5/36; C09D 17/007; C09D 17/008; C09D 11/50; C09D 11/037; C01P 2004/82; C01P 2006/60; D06P 3/32; D06P 1/67383; D06P 1/673

See application file for complete search history.

(56) References Cited

U.S. PATENT DOCUMENTS

| | | | |
|---|---|---|---|
| 3,236,596 A | 2/1966 | Zirngibl et al. | |
| 4,269,809 A | 5/1981 | Tolley et al. | |
| 6,056,815 A * | 5/2000 | Fu ........................ | C09C 1/0015 106/415 |
| 6,306,195 B1 | 10/2001 | Das et al. | |
| 6,375,923 B1 | 4/2002 | Duyvesteyn et al. | |
| 6,500,396 B1 | 12/2002 | Lakshmanan et al. | |
| 2013/0164356 A1* | 6/2013 | Pfaff ...................... | A23G 3/343 424/401 |

FOREIGN PATENT DOCUMENTS

| | | |
|---|---|---|
| CN | 1766137 A | 5/2006 |
| CN | 1803936 A | 7/2006 |
| CN | 101935063 A | 1/2011 |
| CN | 101974258 A | 2/2011 |
| CN | 102602991 A | 7/2012 |
| CN | 102616842 A | 8/2012 |
| CN | 102876090 A | 1/2013 |
| CN | 103849168 A | 6/2014 |
| DE | 60010702 T2 | 5/2005 |

OTHER PUBLICATIONS

International Search Report, International Application No. PCT/CN2015/070228, [dated Dec. 2015].

* cited by examiner

*Primary Examiner* — Anthony J Green
(74) *Attorney, Agent, or Firm* — Kramer Levin Naftalis & Frankel LLP

(57) ABSTRACT

A preparation method of pearlescent pigment coating materials is provided. The method of the present invention lies in that titanium-iron ions in ilmenites are dissolved by using a hydrochloric acid at a certain temperature and pressure, and then ferrous chloride in the acidolysis solution is precipitated by adding hydrogen chloride gas, the remaining titanium-iron ions are separated from other colored ions by means of co-extraction using an extractant upon oxidation, and an enriched titanium oxydichloride solution and ferrous hydrous oxide are obtained by employing a fractional back extraction and enrichment method, the titanium oxydichloride solution can be used for mica-titanium based pearlescent pigment coating materials, and can also be used for preparing titanium dioxide; and the acidified ferrous hydrous oxide and the oxidized ferrous chloride can be used as iron based pearlescent pigment coating materials or used for preparing iron oxide pigments.

16 Claims, 1 Drawing Sheet

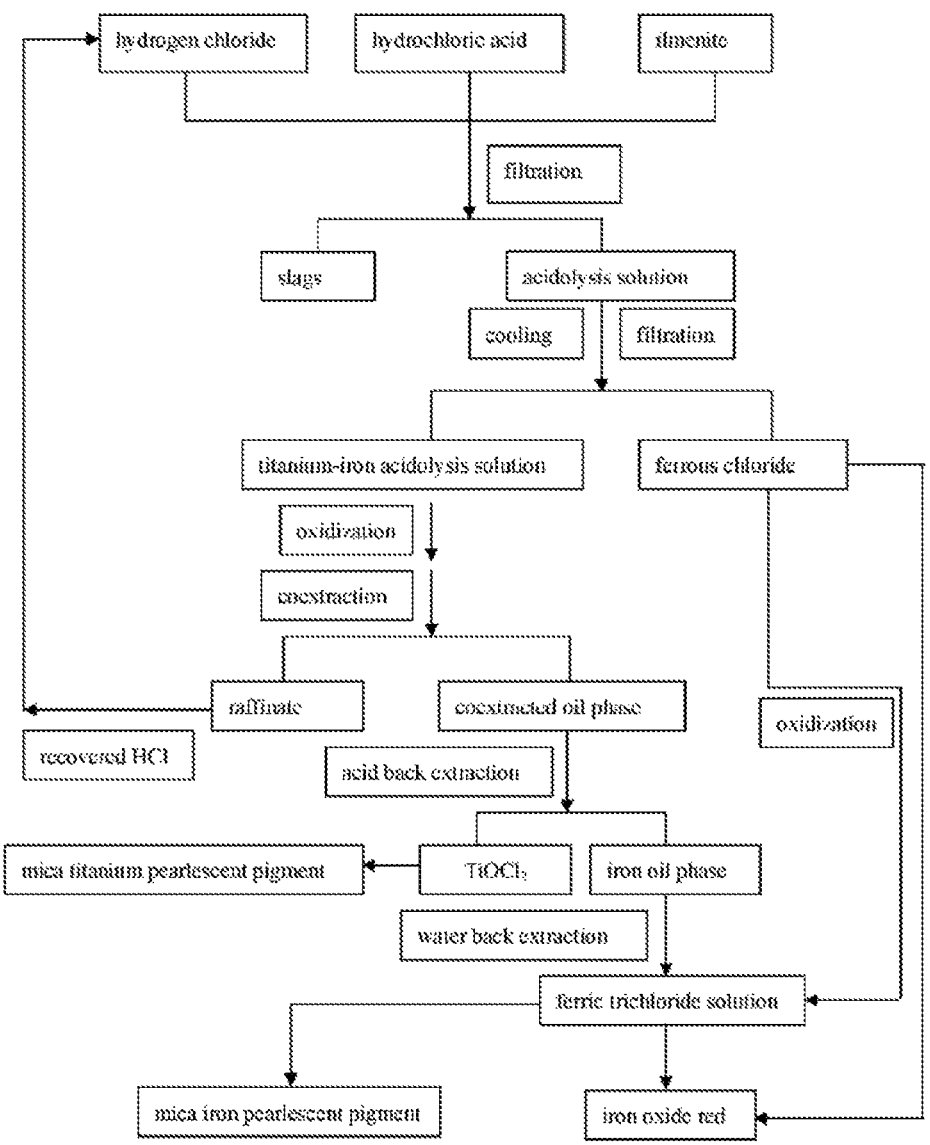

METHOD FOR PREPARING PEARLESCENT PIGMENT FROM ILMENITE HYDROCHLORIC ACID ACIDOLYSIS SOLUTION BY CO-EXTRACTION

TECHNICAL FIELD

The present invention relates to a method for preparing pearlescent pigments from a hydrochloric acid acidolysis solution of ilmenite by means of co-extraction, particularly relates to preparing coating material of pearlescent pigments by means of acidolysis of ilmenite, and in particular, acidolysis of ilmenite using hydrochloric acid and a separation method of titanium-iron irons in an acidolysis solution, preparing pearlescent pigments and preparing iron oxide pigments by using separated iron ions as coating material, and preparing pearlescent pigments and preparing raw materials of titanium dioxide by using a titanium solution with iron ions separated therefrom as coating material.

BACKGROUND ART

Pearlescent pigments are a pigment with pearly luster made by coating a sheet substrate with one or more metallic oxides, and different oxides and oxide thicknesses can lead to different pearl effects. At present, the vast majority of iron pearlescent pigments take ferric trichloride as a coating iron oxide precursor, and the vast majority of titanium pearlescent pigments take titanium tetrachloride as a coating titanium dioxide precursor.

Ilmenite is an oxide ore of titanium and iron, and is the main ore for smelting titanium. At present, the titanium tetrachloride or titanyl sulfate is mainly prepared by using chlorination method or sulfuric acid method, and further refined for removal of impurities. The chlorination method comprises: mixing a high-titanium slag with petroleum coke at a certain ratio, crushing. and reacting the mixture by introducing a chlorine gas to generate a titanium tetrachloride gas, condensing the titanium tetrachloride gas to obtain a liquefied titanium tetrachloride liquid, filtering and distillating the titanium tetrachloride liquid to obtain a titanium tetrachloride finished product. The sulfuric acid method comprises infiltrating ore with a sulfuric acid to generate a large amount of waste acid and ferrous sulfate.

At present, there are two methods for the research of dissolving ilmenite with a hydrochloric acid. One is, as a previous step of the sulfuric acid method, at the condition of a high temperature and low acid ore ratio, dissolving the impurities in the ilmenite, then precipitating titanium in the form of a metatitanic acid after dissolution to serve as a raw material in the next step of dissolving by sulfuric acid, see e.g. Patents CN 1766137A, CN 101935063A, CN 102602991A, CN 102616842A, etc. The other one is directly dissolving the ore with a hydrochloric acid, and then separating titanium oxydichloride by extraction, see e.g. U.S. Pat. Nos. 3,236,596, 4,269,809, 6,500,396B1, 6,375,923, CN101935063A, etc. These methods are all used directly in the production of synthetic rutile, rather than pearlescent pigment coating.

SUMMARY OF THE INVENTION

An object of the present invention is to provide a method for preparing a pearlescent pigment coating material. The concept of the present invention is dissolving titanium-iron ions in ilmenite with hydrochloric acid and hydrogen chloride gas, co-extracting and enriching the titanium-iron ions by using an extractant, and carrying out fractional back-extraction to the titanium-iron ions by using different back-extractants, to obtain enriched titanium oxychloride and ferric trichloride, which can be used respectively as mica titanium based and mica iron based pearlescent pigment coating materials. The raffinate can be used for recovery of the hydrochloric acid.

According to the first embodiment of the present invention, provided is a method for simultaneously preparing sheet substrate/$Fe_2O_3$ pearlescent pigments and sheet substrate/$TiO_2$ pearlescent pigments by acidolysis of ilmenite using hydrochloric acid, that is, provided is a method for preparing pearlescent pigments comprising a ferric oxide ($Fe_2O_3$) coating layer or a titanium dioxide ($TiO_2$) coating layer or a $Fe_2O_3/TiO_2$ coating layer from ilmenite by using co-extraction, the method comprises the following steps:

(1) adding hydrochloric acid and ilmenite into a reaction kettle according to a certain acid/ore mass ratio, raising the temperature to an elevated temperature T1 under stirring, and then reacting at the reaction temperature T1 (reaction time of for example 2 to 12 hours), wherein hydrogen chloride gas is introduced during the reaction process, and the system is kept at the pressure P higher than the atmospheric pressure, e.g. ranging from 0.101-2.5 MPa or 0.1015-2.5 MPa, preferably 0.102-2.0 MPa, preferably 0.2-1.6 MPa, preferably 0.3-1.5 MPa, preferably 0.4-1.4 MPa, preferably 0.5-1.3 MPa, further preferably 0.6-1.2 MPa, more further preferably 0.8-1.2 MPa; directly filtering (e.g., pressure filtering) the reaction mixture after completion of the reaction to obtain a filtrate, cooling the filtrate, and carrying out solid-liquid separation (e.g., centrifugal separation) to obtain a hydrochloric acid solution A0 containing titanium-iron ions and a ferrous chloride precipitate C0, and then, optionally, directly calcining the clean ferrous chloride precipitate C0 obtained by centrifugation to obtain an iron oxide red pigment C1, or oxidizing the precipitate C0 by using an oxidant (e.g., chlorine gas) to obtain a ferric oxide product C2, and then dissolving the ferric oxide product C2 in water to obtain an ferric trichloride solution III (it can be used as an coating material for mica iron pearlescent pigments);

(2) adding the hydrochloric acid solution A0 containing the titanium-iron ions obtained in the step (1) into a co-extractor, carrying out a one-stage or multistage extraction (for example, performing co-extraction 2-6 times, preferably 3-5 times) by using a co-extractant, combining the extracts as organic phase in the respective stage to obtain an iron-titanium enriched extract liquid, namely an organic phase A1, wherein the remaining aqueous phase after the one-stage or multistage co-extraction is a high-acidity raffinate with variegated ions Mn, V, Cr and containing no iron and titanium ions, namely an aqueous phase B1, (e.g., it can be used for recovery of hydrochloric acid and the hydrogen chloride gas);

(3) adding the iron-titanium enriched extract liquid A1 into a titanium back-extractor, back-extracting the titanium ions by using a titanium back-extractant to obtain an organic phase A2 containing iron ions and a raffinate I as an aqueous phase containing titanium oxydichloride, referred to as a solution I containing titanium oxydichloride (the raffinate I can be directly used as a coating material of a mica titanium pearlescent pigment 1 and a raw material of titanium white);

(4) adding the organic phase A2 containing iron ions into an iron back-extractor, back-extracting iron with water to obtain a purified ferric trichloride solution II (which can be used as a coating material of mica iron pearlescent pigments), and optionally, treating the ferric trichloride solution II by using an alkali precipitation method or a hydrothermal method to obtain an iron oxide red pigment; and returning the remaining organic phase to the co-extractor of step (2); and (5) sheet substrate coating step: coating sheet substrate raw materials or secondary sheet substrates with a ferric oxide ($Fe_2O_3$) coating layer or a titanium dioxide ($TiO_2$) coating layer or a $Fe_2O_3/TiO_2$ coating layer by using the ferric trichloride solutions II and/or III [i.e., using the aqueous ferric trichloride solution II in the step (4) or the aqueous ferric trichloride solution III obtained in the step (1) or a mixed solution of the aqueous ferric trichloride solution II and the aqueous ferric trichloride solution III (i.e., a II+III mixed solution), the same below], and/or using the titanium oxydichloride solution I in the step (3).

Preferably, the step (5) is or comprises:

(5) sheet substrate coating step, the coating step comprises the following substeps:

substep 5.1) coating of a $Fe_2O_3$ film layer: coating the sheet substrate raw materials (or referred to as primary sheet substrates or original sheet substrates) with the $Fe_2O_3$ film layer by using the solution II and/or III [i.e., using aqueous ferric trichloride solution II in the step (4) or the aqueous ferric trichloride solution III obtained in the step (1) or a mixed solution of the aqueous ferric trichloride solution II and the aqueous ferric trichloride solution III (i.e., a II+III mixed solution), the same below], to obtain iron-based pearlescent pigments "substrate+$Fe_2O_3$" having a $Fe_2O_3$ coating layer, namely pearlescent pigments (PP5a) (it is in the form of a slurry mixture comprising the pearlescent pigments (PP5a). It may be used as a starting slurry in the next step of coating process, or it may be further filtered, dried and calcined to obtain finished pearlescent pigments PP5a), and optional substep 5.2) coating of a $TiO_2$ film layer: further coating the prepared pearlescent pigments (PP5a) as secondary sheet substrates with a $TiO_2$ film layer by using the titanium oxydichloride solution I in the step (3) thus to obtain titanium-iron based pearlescent pigments "substrate+$Fe_2O_3$+$TiO_2$" having a $Fe_2O_3$ coating layer and a $TiO_2$ coating layer, namely pearlescent pigments (PP5ab) (it is in the form of a slurry mixture comprising the pearlescent pigment (PP5ab). It may be further filtered, dried and calcined to obtain finished pearlescent pigments PP5ab); and/or (6) sheet substrate coating step, the coating step comprise the following substeps:

substep 6.1) coating of a $TiO_2$ film layer: coating the sheet substrate raw materials with a $TiO_2$ film layer by using titanium oxydichloride solution I in the step (3) to obtain titanium based pearlescent pigments "substrate+$TiO_2$" having a $TiO_2$ coating layer, namely pearlescent pigments (PP6a) (They are in the form of a slurry mixture comprising the pearlescent pigment (PP6a). They may be used as a starting slurry in the next coating process or They may be further filtered, dried and calcined to obtain finished pearlescent pigments PP6a), and optional substep 6.2) coating of a $Fe_2O_3$ film layer: further coating the prepared pearlescent pigments (PP6a) serving as secondary sheet substrates with the $Fe_2O_3$ film layer by using the solution II and/or III, thus to obtain titanium-iron based pearlescent pigments "substrate+$Fe_2O_3$+$TiO_2$" having a $TiO_2$ coating layer and a $Fe_2O_3$ coating layer, namely pearlescent pigments (PP6ab) (They are in the form of a slurry mixture comprising the pearlescent pigments (PP6ab). They may be further filtered, dried and calcined to obtain finished pearlescent pigments PP6ab); and/or (7) sheet substrate coating step, the coating step comprises the following substeps:

substep 7.1) coating of a $TiO_2/Fe_2O_3$ film layer: coating the sheet substrate raw materials with the $TiO_2/Fe_2O_3$ film layer by using a mixture formed by the solution II and/or III and the titanium oxydichloride solution I in the step (3) (e.g. in a molar ratio of Ti:Fe=0.5-1.5:1, preferably a molar ratio of 1:1) to obtain titanium-iron based pearlescent pigments "substrate+$TiO_2/Fe_2O_3$" having a $TiO_2/Fe_2O_3$ coating layer, namely pearlescent pigments (PP7a) (They are in the form of a slurry mixture comprising the pearlescent pigments (PP7a). They may be used as a starting slurry in the next step of the coating process, or They may be further filtered, dried and calcined to obtain finished pearlescent pigments PP7a), and optionally the following two substeps 7.2) and 7.3) (generally both the two substeps must be taken or taken simultaneously):

substep 7.2) coating of a $SiO_2$ film layer: further coating the prepared pearlescent pigment (PP7a) serving as secondary sheet substrates with the $SiO_2$ film layer by using an aqueous sodium metasilicate solution to obtain pearlescent pigments "substrate+$TiO_2/Fe_2O_3$+$SiO_2$", namely pearlescent pigments (PP7ab) (they are in the form of a slurry mixture comprising the pearlescent pigments (PP7ab). They may be used as a starting slurry in the next step of the coating process, or they may be further filtered, dried and calcined to obtain finished pearlescent pigments PP7ab), and substep 7.3) coating of a $TiO_2/Fe_2O_3$ film layer: coating the prepared pearlescent pigments (PP7ab) serving as secondary sheet substrates with the $TiO_2/Fe_2O_3$ film layer by using a mixture formed by solution II and/or III and the titanium oxydichloride solution I in the step (3) (e.g. in a molar ratio of Ti:Fe=0.5-1.5:1, preferably a molar ratio of 1:1) to obtain pearlescent pigments "substrate+$TiO_2/Fe_2O_3$+$SiO_2$+$TiO_2/Fe_2O_3$" having three coating layers, namely pearlescent pigments (PP7abc) (They are in the form of a slurry mixture comprising the pearlescent pigments (PP7abc). They may be further filtered, dried and calcined to obtain finished pearlescent pigments PP7abc); and/or (8) sheet substrate coating step, the coating step comprises the following substeps:

substep 8.1) coating of a $Fe_2O_3$ film layer: coating the sheet substrate raw materials with the $Fe_2O_3$ film layer by using the solution II and/or III to obtain iron based pearlescent pigments "substrate+$Fe_2O_3$" having a $Fe_2O_3$ coating layer, namely pearlescent pigments (PP8a) (they are in the form of a slurry mixture comprising the pearlescent pigments (PP8a). They may be used as a starting slurry in the next step of the coating process, or they may be further filtered, dried and calcined to obtain finished pearlescent pigments PP8a), substep 8.2) coating of a $SiO_2$ film layer: further coating the prepared pearlescent pigments (PP8a) serving as secondary sheet substrates with the $SiO_2$ film layer by using an aqueous sodium metasilicate solution to obtain pearlescent pigments "substrate+$Fe_2O_3$+$SiO_2$", namely pearlescent pigments (PP8ab) (they are in the form of a slurry mixture comprising the pearlescent pigments (PP8ab). They may be used as a starting slurry in the next step of the coating process, or they may be further filtered, dried and calcined to obtain a finished pearlescent pigment PP8ab), and substep 8.3) coating of a $Fe_2O_3$ film layer: further coating the prepared pearlescent pigments (PP8ab) serving as secondary sheet substrates with the $Fe_2O_3$ film layer by using the solution II and/or III to obtain pearlescent pigments "substrate+$Fe_2O_3$+$SiO_2$+$Fe_2O_3$" having three coating layers, namely pearlescent pigments (PP8abc) (they are in the form of a slurry mixture comprising the pearlescent pigments (PP8abc). They may be further filtered, dried and calcined to obtain finished pearlescent pigments PP8abc); and/or (9) sheet substrate coating step, the coating step comprises the following substeps:

substep 9.1) coating of a $TiO_2$ film layer: coating the sheet substrate raw materials with the $TiO_2$ film layer by using the titanium oxydichloride solution I in the step (3) to obtain titanium based pearlescent pigments "substrate+$TiO_2$" having a $TiO_2$ coating layer, namely pearlescent pigments (PP9a) (They are in the form of a slurry mixture comprising the pearlescent pigments (PP9a). They may be used as a starting slurry in the next step of the coating process, or they may be further filtered, dried and calcined to obtain finished pearlescent pigments PP9a), substep 9.2) coating of a $SiO_2$ film layer: further coating the prepared pearlescent pigments (PP9a) serving as secondary sheet substrates by using an aqueous sodium metasilicate solution with the $SiO_2$ film layer to obtain pearlescent pigments "substrate+$TiO_2$+$SiO_2$" having three coating layers, namely pearlescent pigments (PP9ab) (they are in the form of a slurry mixture comprising the pearlescent pigments (PP9ab)). They may be used as a starting slurry in the next step of the coating process, or they may be further filtered, dried and calcined to obtain finished pearlescent pigments PP9ab), and substep 9.3) coating of a $TiO_2$ film layer: coating the prepared pearlescent pigments (PP9ab) serving as secondary sheet substrates with the $TiO_2$ film layer by using the titanium oxydichloride solution I in the step (3) to obtain pearlescent pigment "substrate+$TiO_2$+$SiO_2$+$TiO_2$" having three coating layers, namely pearlescent pigments (PP9abc) (they are in the form of a slurry mixture comprising the pearlescent pigments (PP9abc). They may be used as a starting slurry in the next step of the coating process, or they may be further filtered, dried and calcined to obtain finished pearlescent pigments PP9abc), or substep 9.3) coating of a $Fe_2O_3$ film layer: coating the prepared pearlescent pigments (PP9ab) serving as secondary sheet substrates with the $Fe_2O_3$ film layer by using the solution II and/or III to obtain pearlescent pigments "substrate+$TiO_2$+$SiO_2$+$Fe_2O_3$" having three coating layers, namely pearlescent pigments (PP9abd) (they are in the form of a slurry mixture comprising the pearlescent pigments (PP9abd)). They may be further filtered, dried and calcined to obtain finished pearlescent pigments PP9abd); and/or

(10) sheet substrate coating step, the coating step comprises the following substeps:

substep 10.1) coating of a $SnO_2$ film layer: coating the sheet substrate raw materials with the $SnO_2$ film layer by using an aqueous stannic chloride solution (e.g. in a concentration of 2-5 wt %, such as 2.5 wt %) to obtain tin based pearlescent pigments "substrate+$SnO_2$" having a $SnO_2$ coating layer, namely pearlescent pigments (PP10a) (they are in the form of a slurry mixture comprising the pearlescent pigments (PP10a)). They may be used as a starting slurry in the next step of the coating process, or they may be further filtered, dried and calcined to obtain finished pearlescent pigments PP10a), substep 10.2) coating of a $TiO_2$ film layer: coating the prepared pearlescent pigments (PP10a) serving as secondary sheet substrates with the $TiO_2$ film layer by using the titanium oxydichloride solution I in the step (3) to obtain tin-titanium based pearlescent pigments "substrate+$SnO_2$+$TiO_2$" having a $SnO_2$ coating layer and $TiO_2$ coating layer, namely pearlescent pigments (PP10ab) (they are in the form of a slurry mixture comprising the pearlescent pigments (PP10ab)). They may be used as a starting slurry in the next step of the coating process, or they may be further filtered, dried and calcined to obtain finished pearlescent pigments PP10ab), and optionally the following two substeps 10.3) and 10.4) (generally both the two substeps must be taken or taken simultaneously): substep 10.3) coating of a $SiO_2$ film layer: coating the prepared pearlescent pigments (PP10ab) serving as secondary sheet substrates with the $SiO_2$ film layer by using an aqueous sodium metasilicate solution to obtain pearlescent pigments "substrate+$SnO_2$+$TiO_2$+$SiO_2$", i.e., pearlescent pigments (PP10abc), (they are in the form of a slurry mixture comprising the pearlescent pigments (PP10abc)). They may be used as a starting slurry in the next step of the coating process, or they may be further filtered, dried and calcined to obtain finished pearlescent pigments PP10abc), and substep 10.4) coating of a $TiO_2$ film layer: coating the prepared pearlescent pigment (PP10abc) serving as secondary sheet substrates with the $TiO_2$ film layer by using the titanium oxydichloride solution I in the step (3) to obtain pearlescent pigments "substrate+$SnO_2$+$TiO_2$+$SiO_2$+$TiO_2$" having four coating layers, namely pearlescent pigments (PP10abcd) (they are in the form of a slurry mixture comprising the pearlescent pigments (PP10abcd). They may be further filtered, dried and calcined to obtain finished pearlescent pigments PP10abcd); or substep 10.4) coating of a $SnO_2$ film layer and $TiO_2$ film layer: 10.4.1) first, coating the prepared pearlescent pigments (PP10abc) serving as secondary sheet substrates with the $SnO_2$ film layer by using an aqueous stannic chloride solution (e.g., in a concentration of 2-5 wt %, such as 2.5 wt %) to obtain pearlescent pigment "substrate+$SnO_2$+$TiO_2$+$SiO_2$+$SnO_2$" having a $SnO_2$ coating layer, namely pearlescent pigments (PP10abce) (they are in the form of a slurry mixture comprising the pearlescent pigments (PP10abce). They may be used as a starting slurry in the coating process of the next step 10.4.2), or they may be further filtered, dried and calcined to obtain finished pearlescent pigments PP10abce); 10.4.2) then coating the pearlescent pigments (PP10abce) prepared in 10.4.1) and serving as secondary sheet substrates with the $TiO_2$ film layer on by using the titanium oxydichloride solution I in the step (3) to obtain pearlescent pigments "substrate+$SnO_2$+$TiO_2$+$SiO_2$+$SnO_2$+$TiO_2$" having five coating layers, i.e., pearlescent pigments (PP10abcef) (they are in the form of a slurry mixture comprising the pearlescent pigment (PP10abcef). They may be further filtered, dried and calcined to obtain finished pearlescent pigments PP10abcef).

Preferably, the substep 5.1) is carried out as follows: adding water to the sheet substrates (such as grinded and classified mica powders) for beating and stirring, the resulting slurry has an initial solid content ranging from 3 to 25 wt %, preferably 4 to 20 wt %, and raising the temperature to an elevated temperature T3, adjusting the slurry to the pH value of 1 to 5 (preferably in the range of 2 to 4), adding the ferric trichloride solution II and/or III (such as the ferric trichloride solution II) prepared in the step (4)) to the slurry at a certain feed rate, and meanwhile adding an alkali solution to keep the pH value constant, and reacting for a period of time to obtain sheet substrate/$Fe_2O_3$ pearlescent pigments.

Preferably, the substep 6.1) is carried out as follows: adding water into the sheet substrates (such as grinded and classified mica powders) for beating and stirring to obtain a slurry having an initial solid content ranging from 3 wt % to 25 wt %, preferably 4 to 20 wt %, raising the temperature to an elevated temperature T2, adjusting the pH value of the slurry in the range of 1 to 4 (preferably in the range of 1.2 to 3), adding the aqueous titanium oxydichloride solution I prepared in the step (3) into the slurry at a certain feed rate, and meanwhile adding an alkali solution to keep the pH value constant, and reacting for a period of time to obtain sheet substrate/$TiO_2$ pearlescent pigments.

In general, in the substep (5.1) above, after a period of time, for example, 5 to 10 hours of reaction, a slurry-like reaction mixture can be obtained, then the mixture is filtered, the filter cake is oven-dried and then placed into a muffle furnace, heated to 850 to 950° C. (e.g., 900° C.) at a heating rate of 8-15° C./min (e.g., 10° C./min) and maintained for 0.5 to 3 hours (1 hour), and taken out and cooled to room temperature, thereby obtaining red iron based pearlescent pigments.

In general, in the substep (6.1) above, after a period of time, for example, 5 to 10 hours of reaction, a slurry-like reaction mixture can be obtained, then the mixture is filtered, the obtained filter cake is oven-dried and then placed into a muffle furnace to be heated to 750 to 850° C. (e.g., 800° C.) at a heating rate of 8-15° C./min (e.g., 10° C./min) and maintained for 0.5 to 3 hours (1 hour), and is taken out and cooled to room temperature, thereby obtaining golden rainbow-type titanium-based pearlescent pigments.

In general, in the present application, whether sheet substrate raw materials (or primary sheet substrates) or secondary sheet substrates are used, it is preferred that the same or substantially the same process conditions are adopted in the same type of coating processes of the substrates. For example, the condition for coating the sheet substrate raw materials (or the primary sheet substrates) with a $Fe_2O_3$ film layer is the same as or substantially the same as the condition for coating the secondary sheet substrates with a $Fe_2O_3$ film layer. The rest may be deduced by analogy. The process conditions described herein include pH value, reaction temperature, reaction time, etc.

In the present application, the substrates or sheet substrates refer to or includes sheet substrate raw materials (or called primary sheet substrates), or secondary sheet substrates. The secondary sheet substrates refer to a product obtained by coating the primary sheet substrates or the sheet substrates with at least one film layer. Although the secondary sheet substrates have been coated with at least one (e.g., one or two or three) layers, it still can be used as substrates for further coating.

In the present application, the initial solid content of the starting slurry comprising the primary sheet substrates or secondary sheet substrates generally ranges from 3 to 25 wt %, preferably 4 to 20 wt %, more preferably 5 to 15 wt %, e.g., 6, 8, 10 or 12 wt %.

In general cases, the process or the technological condition of coating the sheet substrates with the $Fe_2O_3$ film layer is that a solution II and/or III (for example, the aqueous ferric trichloride solution II prepared in the step (3) above) is added or dropwise added to a starting slurry (the initial solid content is 3-25 wt %, preferably 4-20 wt %, and more preferably 5-15 wt %, for example, 6 wt %, 8 wt %, 10 wt % or 12 wt %) containing the sheet substrates (for example, the primary sheet substrates such as grinded and classified mica powder raw materials, or secondary sheet substrates) and water at an elevated temperature (T2) (for example, 60-95° C., preferably 65-90° C., further preferably 70-90° C., and more preferably 75-85° C.) in the pH value range of 1 to 5 and preferably 2 to 4 at a certain feed rate (for example, the feed rate of 1-2 mL/min is adopted for the total starting slurry amount of 2000-2500 mL), and meanwhile the pH value of the reaction mixture is kept constant by adding the alkaline solution, and a slurry-like mixture (called as slurry) containing pearlescent pigment "substrate+$Fe_2O_3$" particles is obtained through reaction for a period of time (for example, 5-10 hours). The obtained slurry-like mixture can be used as the starting slurry for next film coating, alternatively, the slurry mixture is filtered, the obtained filter cake is oven-dried and then roasted or baked (for example, at the temperature of 850-950° C., such as 900° C.), for example, the obtained filter cake is oven-dried and put in a muffle furnace to be heated to 850-950° C. (for example, 900° C.) at a heating rate of 8-15° C./min (for example, 10° C./min), is subjected to heat preservation for 0.5-3 hours (1 hour) for roasting, and is taken out and cooled to room temperature, thereby obtaining a final product, i.e., (red) iron based pearlescent pigments. In general cases, the process or the technological condition of coating the sheet substrates with the $TiO_2$ film layer is that: the titanyl dichloride solution I prepared in the step (3) above is added or dropwise added to the starting slurry (the initial solid content is 3-25 wt %, preferably 4-20 wt % and more preferably 5-15 wt %, for example, 6 wt %, 8 wt %, 10 wt % or 12 wt %) containing the sheet substrates (for example, the primary sheet substrates such as the grinded and classified mica powder raw materials, or the secondary sheet substrates) and water at an elevated temperature (T3) (for example, 60-95° C., preferably 65-90° C., further preferably 70-90° C., and more preferably 75-85° C.) in the pH value range of 1-4, preferably 1.2 to 3 and more preferably 1.5 to 2.3 at a certain feed rate (for example, the feed rate of 1-2 mL/min is adopted for the starting slurry having a total amount of 2000-2500 mL), and meanwhile the pH value of the reaction mixture is kept constant by adding the alkaline solution, and a slurry-like mixture (called as slurry) containing pearlescent pigment "substrate+$TiO_2$" particles is obtained through reaction for a period of time (for example, 5-10 hours). The obtained slurry-like mixture can be used as the starting slurry for next film coating, alternatively, the slurry mixture is filtered, the obtained filter cake is oven-dried and then roasted or baked (for example, at the temperature of 750-850° C., such as 800° C.), for example, the obtained filter cake is oven-dried and put in the muffle furnace to be heated to 750-850° C. (for example, 800° C.) at a heating rate of 8-15° C./min (for example, 10° C./min) and maintained for 0.5-3 hours (such as 1 hour) for roasting, and is taken out and cooled to room temperature, and thereby obtaining a final product, i.e., (golden rainbow-type) titanium based pearlescent pigments.

For the technology of coating the substrates or the sheet substrates with a $SnO_2$ film layer and the technology of coating the substrates or the sheet substrates with a $SiO_2$ film layer, common technologies in the prior are can be adopted respectively. Alternatively, a method which is the same as or similar to that for coating the sheet substrates with the $Fe_2O_3$ film layer or that for coating the sheet substrates with the $TiO_2$ film layer is adopted, but in this method, the aqueous ferric trichloride solution (II and/or III) or the titanium oxydichloride solution I is replaced with an aqueous stannic chloride solution or an aqueous sodium metasilicate solution. After the slurry mixture coated with the $SnO_2$ film layer or the slurry mixture coated with the $SiO_2$ film layer is obtained, the obtained slurry mixture can be used as the starting slurry for next film coating, alternatively, the slurry mixture is filtered, the obtained filter cake is oven-dried and then roasted or baked (for example, at the temperature of 750-850° C. such as 800° C.), or at the temperature of 850-950° C. (for example, 900° C.), for example, the obtained filter cake is oven-dried and put in the muffle furnace to be heated to 750-850° C. (for example, 800° C.) or 850-950° C. (for example, 900° C.) at a heating rate of 8-15° C./min (for example, 10° C./min) and maintained for 0.5-3 hours (1 hour) for roasting, and is taken out and cooled to room temperature, thereby obtaining a final product. When the secondary sheet substrates are further coated with an additional film layer, the type of the outermost coating film layer of the secondary sheet substrates is different from that of the additional film layer. For example, when the outermost coating film layer of the secondary sheet substrates is $TiO_2$, the additional film layer is any type of coating film layer other than $TiO_2$, for example, $Fe_2O_3$.

In general, the ilmenite in the step (1) is titanium concentrates, ilmenite, high titanium slags or modified titanium concentrates, preferably titanium concentrates, ilmenite, high titanium slags or modified titanium concentrates having a titanium dioxide content of 30-80 wt %, more preferably 40-70wt %, and more preferred 45-65 wt %.

Generally speaking, the concentration of the hydrochloric acid in the step (1) is 25-45 wt %, preferably 28-44 wt %, further preferably 30-42 wt %, more further preferably 32-40 wt %, and more preferably 33-37 wt %.

In addition, the inventors of the present application unexpectedly found that there is no need to add an oxidant for assisting in dissolution of the ilmenite in the step (1), and there is only a need to introducing a hydrogen chloride gas into an acid/ore mixture to keep the pressure P of the reaction kettle higher than atmospheric pressure, for example, at 0.101-2.5 MPa or 0.1015-2.5 MPa, preferably 0.102-2.0 MPa, preferably 0.2-1.6 MPa, preferably 0.3-1.5 MPa, preferably 0.4-1.4 MPa, preferably 0.5-1.3 MPa, further preferably 0.6-1.2 MPa, and more further preferably 0.8-1.2 MPa. That is, the hydrogen chloride in the solution reaches a supersaturation concentration under the pressure higher than atmospheric pressure, so that the mineral dissolution rate seems to be very slow or the dissolution is incomplete, but it is detected that what is undissolved is a ferrous compound, while other ions are rapidly dissolved into the solution, on the contrary, this facilitates beforehand separation of most of ferrous ions and reduction of subsequent ferric extraction burden.

Furthermore, the inventors further unexpectedly found that the extractant extracts not only trivalent and divalent iron ions, but also titanium ions under high acidity (mineral dissolution reaction is performed under the condition that the hydrogen chloride is supersaturated). Therefore, some extractants for extracting the iron ions are changed into a co-extractant for simultaneously extracting both titanium ions and iron ions under the high acidity condition of the present application, but the extraction efficacy on impurity ions such as variegated ions Mn, V and Cr is inhibited.

Generally, the co-extractant in the step (2) should be selected from the co-extractants having high or very high extraction efficacy on iron ions and titanium ions (for example, the iron ion content in the extract may reach 100 g/L or higher, 130 g/L or higher, or even 150 g/L or higher, and the titanium ion content may reach 120g/L or higher, 150 g/L or higher, or even 170 g/L or higher) but having low or very low extraction efficacy on foreign metal ions such as Mn, V and Cr (for example, the content of the foreign metal ions such as Mn, V and Cr in the extract is lower than 2.5 ppm) under an acidic condition (for example, pH is lower than 2 or 1.5 or even lower than 1).

The co-extractant in the present application is selected from one or more of secondary carbon primary amine N1923 (namely, $R^1R^2CHNH_2$, $R^1$ or $R^2$ is independently $C_9$-$C_{11}$ alkyl), dimethylbenzene, tributyl phosphate TBP, di(1-methylheptyl) methyl phosphonate P350, trioctyl phosphine oxide TOPO, trialkyl phosphine oxide TRPO, bis(2-ethylhexyl) phosphate P204, mono (2-ethylhexyl) phosphate M2EHPA, 2-ethylhexyl phosphoric acid mono(2-ethylhexyl) ester P507 or bis(2,4,4-trimethylpentyl)phosphinic acid Cyanex272, methyl isobutyl ketone MIBK, sec-octyl alcohol, methylbenzene, isopentanol or sulfonated kerosene, and preferably one or two or more of secondary carbon primary amine N1923, dimethylbenzene, tributyl phosphate TBP, sec-octyl alcohol, trioctyl phosphine oxide TOPO, trialkyl phosphine oxide TRPO and sulfonated kerosene.

Particularly, the co-extractant is preferably secondary carbon primary amine N1923/dimethylbenzene (for example, at the weight ratio of 0.3-3:1, preferably 0.5-2.5:1, and more preferably 0.8-1.5:1), tributyl phosphate TBP/dimethylbenzene (for example, at the weight ratio of 0.3-3:1, preferably 0.5-2.5:1, and more preferably 0.8-1.5:1) and a mixture of di(1-methylheptyl)methyl phosphonate P350, trioctyl phosphine oxide TOPO, trialkyl phosphine oxide TRPO, bis(2-ethylhexyl)phosphate P204, mono(2-ethylhexyl)phosphate M2EHPA, 2-ethylhexyl phosphoric acid mono(2-ethylhexyl)ester P507 or bis(2,4,4-trimethylpentyl) phosphinic acid Cyanex272 and dimethylbenzene, methyl isobutyl ketone MIBK, sec-octyl alcohol, methylbenzene, isopentanol or sulfonated kerosene (for example, at the weight ratio of 0.3-3:1, preferably 0.5-2.5:1, and more preferably 0.8-1.5:1).

Generally, the acid/ore mass ratio in the step (1) is 0.5-15:1, preferably (0.8-12):1, further preferably 1-8:1, more further preferably 1.5-6:1, further preferably 1.8-5:1, and more further preferably 2-4:1.

Generally, the reaction temperature T1 in the step (1) is 30-95° C., preferably 40-90° C., preferably 50-85° C., and further preferably 60-80° C.

Generally, the reaction time in the step (1) is 2-12 hours, preferably 3-11 hours, further preferably 4-10 hours, more preferably 5-9 hours, and still more further preferably 6-8 hours.

In the present application, the purity of the obtained titanium oxydichloride solution I is higher than 99.7 wt %, preferably higher than 99.8 wt %, more preferably higher than 99.9 wt %, still preferably higher than 99.95 wt %, preferably higher than 99.99 wt %, and more preferably higher than 99.999 wt %; or the content of foreign metals or variegated metals (such as, Mn, V and Cr) therein is lower than 10 ppm, preferably lower than 8 ppm, more preferably lower than 6 ppm, further preferably lower than 5 ppm, and most preferably lower than 4 ppm.

The purity of the obtained ferric trichloride solution II or III in the present application is higher than 99.6 wt %, preferably higher than 99.7 wt %, more preferably higher than 99.8 wt %, still preferably higher than 99.85 wt %, more preferably higher than 99.9 wt %, and more preferably higher than 99.98 wt %; or the content of foreign metals or variegated metals (such as, Mn, V and Cr) therein is lower than 20 ppm, preferably lower than 15 ppm, more preferably lower than 12 ppm, further preferably lower than 10 ppm, and most preferably lower than 8 ppm.

In the present application, titanium oxychloride and titanium oxydichloride represent the same concept.

In general, the oxidant used in the step (1) is selected from one or more of potassium chlorate, sodium chlorate, hydrogen peroxide, sodium peroxide, potassium peroxide, sodium percarbonate, potassium percarbonate, oxygen or air, and preferably potassium chlorate, sodium chlorate or air.

In general, the step (2), (3) or (4) is conducted at the temperature of 10-60° C., preferably 15-55° C., and further preferably 20-40° C.; and/or the step (5) or (6) is conducted at the temperature of 60-95° C., preferably 65-90° C., further preferably 70-90° C., and more further preferably 75-85° C.

In general, the mass ratio of the extractant to the hydrochloric acid solution A0 containing the titanium-iron ions in the step (2) is 1-6:1, preferably 1.3-5:1, further preferably 1.5-4:1, more preferably 1.8-3:1, and more further preferably 2-2.5:1.

Generally, the titanium back extractant in the step (3) is one or two selected from deionized water or dilute acids (for example, a dilute inorganic acid (such as, dilute hydrochloric acid, dilute phosphoric acid, dilute sulphuric acid or dilute nitric acid) having a concentration of 0.5-10 wt % and preferably 1-6 wt % or a dilute organic acid (such as, formic acid, acetic acid, propionic acid, butyric acid, trifluoroacetic acid or trifluoromethane sulfonic acid)), and is preferably a dilute hydrochloric acid having a concentration of 0.5-10 wt % and preferably 1-6 wt %.

Generally, the mass ratio of the titanium back extractant to the titanium-iron enriched extract liquid A1 in the step (4) is 3-12:1, preferably 4-10:1, further preferably 5-9:1 and further preferably 6-8:1.

In general cases, in the process of coating sheet substrates with a $TiO_2$ film layer, for example, in the step (5.1), the pH value of the slurry is 1.0-4, preferably 1.1-3.5, further preferably 1.2-3.0 and more preferably 1.4-2.8.

Generally, in the process of coating the sheet substrates with the $Fe_2O_3$ film layer, for example, in the step (6.1), the pH value of the slurry is 1.0-5, preferably 1.5-4.5, further preferably 2.0-4.0 and more preferably 2.5-3.5.

Generally, in the film layer coating process, for example, in the step (5.1) or (6.1), the alkali in the alkaline solution is selected from one or more sodium hydroxide, ammonia water and sodium carbonate.

Generally, the sheet substrate raw materials or primary sheet substrates may be any sheet substrates for the pearlescent pigment, preferably natural mica, synthetic mica, glass sheets, flaky alumina, flaky silica, and various kinds of flaky metals, and preferably the natural mica or the synthetic mica.

Generally, the obtained pearlescent pigment is characterized in that the pigment structure may be any combination of the four substances $SnO_2$, $TiO_2$, $SiO_2$ and $Fe_2O_3$, for example (but not limited to):

substrate+$TiO_2$*
substrate+$SnO_2$+$TiO_2$
substrate+$SnO_2$+$TiO_2$+$SiO_2$+$TiO_2$
substrate+$SnO_2$+$TiO_2$+$SiO_2$+$SnO_2$+$TiO_2$
substrate+$TiO_2$+$Fe_2O_3$
substrate+$TiO_2$+$SiO_2$+$Fe_2O_3$
substrate+$TiO_2$/$Fe_2O_3$**
substrate+$TiO_2$/$Fe_2O_3$+$SiO_2$+$TiO_2$/$Fe_2O_3$
substrate+$Fe_2O_3$
substrate+$Fe_2O_3$+$TiO_2$
substrate+$Fe_2O_3$+$SiO_2$+$Fe_2O_3$
substrate+$TiO_2$+$SiO_2$+$TiO_2$

*: "+" represents layered coating
**: "/" represents mixed coating

Generally, the pearlescent pigments are used in the fields of paints, printing ink, plastics, ceramic materials, leather coloring, wallpaper, powder coatings or cosmetics.

According to the second embodiment of the present invention, provided are sheet substrate/$Fe_2O_3$ pearlescent pigments or sheet substrate/$TiO_2$ pearlescent pigments obtained by the method above.

According to the third embodiment of the present invention, provided is use of the sheet substrate/$Fe_2O_3$ pearlescent pigments or the sheet substrate/$TiO_2$ pearlescent pigments in the fields of paints, printing ink, plastics, ceramic materials, leather coloring, wallpaper, powder coatings or cosmetics.

The present invention used the ilmenite and the hydrochloric acid as the main starting raw materials for the first time, and successfully prepared raw materials, ferric trichloride and titanium oxydichloride, which can be used as pearlescent pigment coating films.

The "reaction kettle" and "extractor" of the present invention are devices commonly used by those skilled in the art, and the "extraction", "back extraction", "grinding", "beating", "stirring" and "cooling filer-pressing" are technologies commonly used by those skilled in the art. The "optionally" indicates performing or not performing. Unless otherwise defined or described, all the professional and scientific terms used herein express the meanings acquainted by those skilled in the art. The technical methods are not described in detail herein, and are all common technical methods in the art.

The reagents used in the present invention, such as, "hydrochloric acid", "mica", "potassium chlorate", "sodium chlorate", "hydrogen peroxide", "tributyl phosphate TBP", "di(1-methylheptyl) methyl phosphonate P350", "methyl isobutyl ketone MIBK", "trioctylamine TOA", "secondary carbon primary amine N1923", "methylbenzene", "isoamyl alcohol", "sulfonated kerosene", "deionized water", "inorganic acid", "organic acid", "dilute hydrochloric acid", "tributyl phosphate TBP", "trioctylamine TOA", "amyl acetate", "bis(2-ethylhexyl)phosphate P204", "dimethylbenzene", "isoamyl alcohol", "sodium hydroxide", "ammonia water" and "sodium carbonate" are all common commercially available materials.

The modified ilmenite concentrate used in the present invention is the ilmenite concentrate subjected to oxidizing roasting and reduction roasting, for example, provided by China Panzhihua Iron and Steel Company.

BENEFICIAL TECHNICAL EFFECTS OF THE PRESENT INVENTION (1) Foreign ions Mn, V and Cr can be removed at very low cost and high efficiency by adopting a co-extraction method.

(2) Both the purity of the titanium oxydichloride, and the purity of the ferric trichloride are remarkably improved, and the quality of the pearlescent pigments is further improved.

(3) The high-acidity raffinate with variegated ions Mn, V and Cr, namely the water phase B1, is very conveniently used for recovering the hydrochloric acid and hydrogen chloride gas; pollutant discharge is avoided.

(4) In addition, for the application of coating the substrates with films, compared with the prior art of adopting titanium tetrachloride as the starting raw material, in the present invention, the titanium oxydichloride is adopted as the starting raw material for film coating, and it is observed under a microscope that the formed $TiO_2$ film layer has clear, brightness and dazzling effect, while the $TiO_2$ film layer formed in the prior art shows a blacking impression, has certain turbidity, is non-uniform in film layer surface and provided with bulges due to the fact that a part of $TiO_2$ exists in the form of particulate matters (seed crystals) during film coating. Furthermore, when a solution for film coating is prepared by adding water to the titanium tetrachloride, upon analysis, it is found that the solution becomes turbid on the second day after standing for one night due to the reason that seed crystal generates and becomes coarser (grain growth)

after standing for several hours and accordingly precipitation occurs, while the titanium oxydichloride solution formed in the present application is still transparent after standing for one month, contains very few impurities and contains no seed crystal, and therefore the effect is obviously better after film coating.

(5) In step 1), no oxidant is added and only a hydrogen chloride gas is introduced, resulting in that most of the ferrous ions are not dissolved but precipitated, and most of the ferrous ions are separated out in advance, thereby reducing the burden for follow-up iron extraction.

(6) The purity of the titanium chloride solution I obtained in the present application is higher than 99.7 wt %, preferably higher than 99.8 wt %, more preferably higher than 99.9 wt %, still preferably higher than 99.95 wt %, preferably higher than 99.99 wt % and more preferably higher than 99.999 wt %; or the content of the foreign metals or the variegated metals (such as Mn, V and Cr) therein is lower than 10 ppm, preferably lower than 8 ppm, more preferably lower than 6 ppm, further preferably lower than 5 ppm and most preferably lower than 4 ppm.

(7) The purity of the obtained ferric trichloride solution II or III is higher than 99.6 wt %, preferably higher than 99.7 wt %, more preferably higher than 99.8 wt %, still preferably higher than 99.85 wt % and more preferably higher than 99.98 wt %; or the content of the foreign metals or the variegated metals (such as Mn, V and Cr) therein is lower than 20 ppm, preferably lower than 15 ppm, more preferably lower than 12 ppm, further preferably lower than 10 ppm and most preferably lower than 8 ppm.

BRIEF DESCRIPTION OF THE DRAWINGS

The FIGURE is a production flow chart of a process of the present invention.

DETAILED DESCRIPTION OF THE INVENTION

Detailed description is further given below to the present invention, in combination with the embodiments, for further understanding of the present invention, but is not intended to limit the present invention. It should be understood that these descriptions are made only for further describing the features and advantages of the present invention but not for the purpose of limiting the claims of the present invention. Any equivalent substitution in this field made according to the contents of the present invention should fall within the scope of protection of the present invention.

EXAMPLE 1

(1) 1500 g of 37% concentrated hydrochloric acid is added to 500 g of high titanium slag (with a titanium dioxide content of 38.7 wt %) and stirred, temperature is raised to 60° C., and hydrogen chloride gas is introduced to maintain the pressure of the reaction kettle at 1 MPa. After reaction of 9 h, press filtration is performed, the filter residues are washed to be neutral, the filtrate is cooled, and then centrifugalized to obtain a titanium-iron solution and a ferrous chloride precipitate. The acidolysis rate of the high titanium slag is up to 98%, the titanium recovery rate is up to 96%, and the iron recovery rate is up to 99%. (2) At 30° C., using the secondary carbon primary amine N1923/dimethylbenzene (wt)=1:1 as an extractant and the ratio of the oil phase to the water phase O/A of 2:1, primary extraction is conducted, and the oil phase is an iron-titanium extract phase (the sum of Mn, V and Cr contents is lower than 2 ppm) and the water phase is an impurity-containing raffinate phase. (3) At 30° C., the iron-titanium extract phase is back extracted with 10% of dilute hydrochloric acid at the O/A ratio of 1:1, the oil phase extractant is introduced into a Fe back extractor, 190 g/L of pure titanium oxydichloride solution I (the purity is higher than 99.99 wt %, and the sum of Mn, V and Cr contents is lower than 2 ppm) that can be used for coating pearlescent pigments is obtained from the water phase, as shown in Table 1. Iron is back extracted with water from the organic phase A2 containing iron ions in the Fe back extractor to obtain a pure ferric trichloride solution II (the purity is higher than 99.99 wt %, and the foreign metal content is lower than 6 ppm) which can be used as a coating material of mica iron pearlescent pigments; the organic phase (oil phase) is returned to the co-extractor; the oxidized ferrous chloride precipitate C1 is dissolved in water to prepare a ferric trichloride solution III (the purity is higher than 99.99 wt %, and the foreign metal content is lower than 6 ppm) which can be used as a coating material of the mica iron pearlescent pigments; or the ferrous chloride precipitate C1 is directly calcined to obtain iron oxide red pigments; or the ferric trichloride solution II is used to obtain the iron oxide red pigments by means of alkali precipitation or through a hydrothermal method.

The impurity-containing raffinate phase obtained in the step (2) is delivered to a hydrochloric acid and hydrogen chloride gas recovery process, and variegated ions are conveniently recovered in the hydrochloric acid and hydrogen chloride gas recovery process.

TABLE 1

| Composition of high titanium slag and acidolysis solution extract liquid | | | | | | | | |
|---|---|---|---|---|---|---|---|---|
| | $TiO_2$ | $\Sigma Fe$ | FeO | MgO | MnO | $SiO_2$ | $Al_2O_3$ | CaO |
| Before acidolysis (%) | 49.6 | 15.2 | 10.88 | 1.05 | 2.07 | 1.11 | 2.24 | 1.34 |
| After acidolysis (g/L) | 192 | 24.96 | 68* | 0.103 | 0.11 | 0.038 | 0.174 | 0.091 |
| Raffinate (ppm) | 3916 | 67 | — | 183 | 209 | 4 | 175 | 10 |
| Primary back-extraction liquid (g/L) | 191.6 | 0.0004 | — | 0.0009 | 0.0007 | 0 | 0.0011 | 0.0003 |

Note:
*the ferrous chloride precipitate is calculated based on the oxide

COMPARATIVE EXAMPLE 1

(1) 1500 g of 37% concentrated hydrochloric acid is added to 500 g of high titanium slag (with a titanium dioxide content of 38.7 wt %) and stirred, temperature is raised 70°

C. to perform reaction for 7 hours, 50 g of KClO$_3$ is added thereto, and the reaction is continued for 1 h and then stopped, after cooling to room temperature, press filtration is performed, filter residues are washed to be neutral. (2) At 30° C., using the TBP/dimethylbenzene (wt)=1:2 as the extractant and the ratio of the oil phase to the water phase O/A of 3:1, 4-stage extractions are conducted, and the oil phase is an iron extraction phase and the water phase is a titanium raffinate phase. (3) The iron extraction phase is back extracted with deionized water at the ratio of O/A=1:10, the oil phase extractant is returned to the Fe back extractor, the water-phase iron is then extracted/back-extracted for purification, a part of water is removed by distillation for concentration, so that the iron content is up to 160 g/L, thereby obtaining a ferric trichloride solution. The titanium raffinate phase is introduced into an impurity-removing extractor, multistage counter-current extractions V are performed by using the extractant, TBP/dimethylbenzene=4:25 at a ratio of O/A=2:1, and the raffinate is introduced into the impurity removing extractor 2, and is extracted on Mn with TBP/dimethylbenzene=1:9 at a ratio of O/A=2:1; the extract liquid is back extracted to obtain a raffinate, i.e., titanium-rich TiOCl$_2$, in which the Ti content may be up to 100000 ppm, thereby preparing a titanium oxydichloride solution which can be used for coating the pearlescent pigments, with the sum of Mn, V and Cr content being 15 ppm.

EXAMPLE 2

The technological conditions are same as those in Example 1, but the high titanium slag is replaced with the ilmenite concentrate.

EXAMPLE 3

The technological conditions are same as those in Example 1, but the high titanium slag is replaced with the modified ilmenite concentrate. In addition, in the step (2), at 30° C., using the secondary carbon primary amine N1923/dimethylbenzene (wt)=1:1 as an extractant and the ratio of the oil phase to the water phase O/A of 2:1, two-stage extractions are conducted, and the resulting combined oil phase is an iron-titanium extraction phase (the sum of the Mn, V and Cr contents is lower than 2.5 ppm) and the water phase is an impurity-containing raffinate phase.

EXAMPLE 4

100 g of mica having a particle size of 10-60 μm and a diameter-to-thickness ratio of more than 50 is weighed and placed into a 2 L beaker, 1500 mL of deionized water is added thereto, the beaker is placed into a water bath kettle, stirring is performed at a rate of 200-300 rps, temperature is raised to 75-85° C., and the pH value of the solution is adjusted to 3-4, the aqueous ferric trichloride solution in Example 1 is added dropwise into the beaker at a rate of 2 mL/min, and the pH value of the solution is maintained constant by using a 30% of NaOH solution. After reaction for 5-6 h, the solution is filtered, the filter cake is oven-dried and then placed into a muffle furnace to be heated to 900° C. at a heating rate of 10° C./min and maintained for 1 h, and is taken out and cooled to the room temperature, thereby obtaining red mica iron pearlescent pigments.

EXAMPLE 5

100 g of mica having a particle size of 10-60 μm and a diameter-to-thickness ratio of more than 50 is weighed and placed into a 2 L beaker, 1500 mL of deionized water is added thereto, the beaker is placed into a water bath kettle, stirring is performed at a rate of 200-300 rps, temperature is raised to 75-85° C., the pH value of the solution is adjusted to 3-4, the aqueous ferric trichloride solution in Example 1 is added dropwise into the beaker at a rate of 2 mL/min, and the pH value of the solution is maintained constant by using a 30% of NaOH solution. After reaction for 5-6 h, the pH value is increased to 8.0 by using the 30% of NaOH solution, 20% of aqueous sodium metasilicate solution is added dropwise at a rate of 1.0 ml/min, after reaction for 1 h, the pH value of the solution is adjusted to 3-4 by using 1:1 hydrochloric acid, the solution is added dropwise into the beaker at a rate of 2 mL/min, and the pH value of the solution is maintained constant by using the 30% of NaOH solution. After reaction for 5-6 h, the solution is filtered, the filter cake is oven-dried and then placed into a muffle furnace to be heated to 900° C. at a heating rate of 10° C./min and maintained for 1 h, and is taken out and cooled to the room temperature, thereby obtaining red mica iron pearlescent pigments.

EXAMPLE 6

100 g of mica having a particle size of 10-60 μm and a diameter-to-thickness ratio of more than or equal to 60 is weighed and placed into a 5 L beaker, 2000 mL of deionized water is added thereto, the beaker is placed into a water bath kettle, stirring is performed at a rate of 200-300 rps, temperature is raised to 60-70° C., the pH value of the solution is adjusted to 1.2-1.8, 100 mL of 2.5% aqueous stannic chloride solution is added, the pH value of the solution is maintained constant by using 30% of NaOH solution, the addition is finished within half an hour, then, temperature is raised to 75-85° C., the pH value is adjusted to 1.5-2.5, the titanium oxychloride solution in Example 1 is added into the beaker at a rate of 1 mL/min, and the pH value of the solution is maintained constant by using the NaOH solution. After reaction for 6-7 h, the solution is filtered, the filter cake is oven-dried and then placed into a muffle furnace to be heated to 800° C. at a heating rate of 10° C./min and maintained for 1 h, and is taken out and cooled to the room temperature, thereby obtaining golden rainbow mica titanium pearlescent pigments.

EXAMPLE 7

100 g of mica having particle size of 10-60 μm and a diameter-to-thickness ratio of more than or equal to 60 is weighed and placed into a 5 L beaker, 2000 mL of deionized water is added thereto, the beaker is placed into a water bath kettle, and stirring is performed at a rate of 200-300 rps, temperature is raised to 60-70° C., the pH value of the solution is adjusted to 1.2-1.8, 100 mL of 2.5% aqueous stannic chloride solution is added, the pH value of the solution is maintained constant by using 30% of NaOH solution, the addition is finished within half an hour, then, temperature is raised to 75-85° C., the pH value is adjusted to 1.5-2.5, the titanium oxychloride solution in Example 1 is added dropwise into the beaker at a rate of 1 mL/min, and the pH value of the solution is maintained constant by using the NaOH solution. After reaction for 6-7 h, the pH value is increased to 8.0 by using the 30% of NaOH solution, 20% of aqueous sodium metasilicate solution is added dropwise at a rate of 1.0 ml/min, after reaction for 1 h, the pH value of the solution is adjusted to 1.5-2.5 by using 1:1 hydrochloric acid, the solution is added dropwise into the beaker at a rate of 1 mL/min, and the pH value of the solution is maintained constant by using the NaOH solution, after reaction for 6-7 h, the solution is filtered, the filter cake is oven-dried and then placed into a muffle furnace to be heated to 800° C. at a heating rate of 10° C./min and maintained for 1 h, and is taken out and cooled to the room temperature, thereby obtaining golden rainbow mica titanium pearlescent pigments.

EXAMPLE 8

100 g of mica having particle size of 10-60 μm and a diameter-to-thickness ratio of more than or equal to 60 is weighed and placed into a 5 L beaker, 2000 mL of deionized water is added thereto, the beaker is placed into a water bath kettle, and stirring is performed at a rate of 200-300 rps, temperature is raised to 60-70° C., the pH value of the solution is adjusted to 1.2-1.8, 100 mL of 2.5% aqueous stannic chloride solution is added, the pH value of the solution is maintained constant by using 30% of NaOH solution, the addition is finished within half an hour, then, temperature is raised to 75-85° C., the pH value of the solution is adjusted to 1.5-2.5, the titanium oxychloride solution in Example 1 is added dropwise into the beaker at a rate of 1 mL/min, and the pH value of the solution is maintained constant by using the NaOH solution, after reaction for 6-7 h, the pH value of the solution is adjusted to 3-4 by using the 30% of NaOH solution, the solution is added dropwise into the beaker at a rate of 2 mL/min, and the pH value of the solution is maintained constant by using the 30% of NaOH solution, after reaction for 5-6 h, the solution is filtered, and the filter cake is oven-dried and then placed into a muffle furnace to be heated to 900° C. at a heating rate of 10° C./min and maintained for 1 h, and is taken out and cooled to the room temperature, thereby obtaining golden pearlescent pigments.

TABLE 2

Performance indexes of the pearlescent pigments

| Serial number | Particle size (D50 μm) | Density (g/cm³) | Oil absorption volume (g/100 g) | Bulk density (g/cm³) | PH value of 10% Wt |
|---|---|---|---|---|---|
| KC205 | 22.5 | 3.1 | 60.5 | 0.25 | 7.76 |
| Example 8 | 22.2 | 3.2 | 60.7 | 0.26 | 7.78 |
| Example 4 | 22.4 | 3.2 | 61.9 | 0.28 | 7.67 |
| KC500 | 22.3 | 3.2 | 62.7 | 0.27 | 7.60 |

TABLE 3

Optical properties of the pearlescent pigments

|  |  | L* | a* | b* | C* | h° |
|---|---|---|---|---|---|---|
| Example 4 | 15° | 91.61 | 33.80 | 56.10 | 65.50 | 58.93 |
|  | 25° | 71.94 | 30.31 | 47.06 | 55.98 | 57.22 |
|  | 45° | 43.03 | 24.62 | 32.93 | 41.12 | 53.22 |
|  | 75° | 26.39 | 22.33 | 26.09 | 34.34 | 49.45 |
|  | 110° | 20.59 | 22.53 | 24.32 | 33.15 | 47.19 |
| KC500 | 15° | 92.23 | 33.15 | 55.89 | 64.98 | 59.33 |
|  | 25° | 72.53 | 29.99 | 46.92 | 55.69 | 57.41 |
|  | 45° | 43.96 | 24.34 | 32.85 | 40.88 | 53.46 |
|  | 75° | 25.91 | 22.01 | 25.72 | 33.85 | 49.44 |
|  | 110° | 19.99 | 22.28 | 23.83 | 32.62 | 46.92 |
| Example 6 | 15° | 110.86 | 0.64 | 47.01 | 47.01 | 89.22 |
|  | 25° | 93.86 | −0.35 | 31.65 | 31.65 | 90.63 |
|  | 45° | 70.13 | −0.79 | 7.15 | 7.19 | 96.27 |

TABLE 3-continued

Optical properties of the pearlescent pigments

|  |  | L* | a* | b* | C* | h° |
|---|---|---|---|---|---|---|
|  | 75° | 59.85 | −0.90 | −4.98 | 5.06 | 259.76 |
|  | 110° | 58.66 | −1.11 | −4.63 | 4.76 | 256.52 |
| KC205 | 15° | 110.55 | 0.01 | 46.39 | 46.39 | 89.99 |
|  | 25° | 94.26 | −0.65 | 31.73 | 31.74 | 91.17 |
|  | 45° | 70.67 | −1.10 | 7.76 | 7.84 | 98.07 |
|  | 75° | 60.14 | −1.10 | −4.38 | 4.52 | 255.90 |
|  | 110° | 58.89 | −1.30 | −4.09 | 4.29 | 252.41 |

From table 3, it can be seen clearly that the products in examples 4 and 6 of the present invention have grotesque angle-dependent optical effects and strong colorful effects.

APPLICATION EXAMPLES

The pearlescent pigments prepared in examples 4-9 above are used in the application fields of paints, coatings, printing ink, plastics, ceramic materials, leather coloring, wallpaper, powder coatings and cosmetics. For example, by adding the pearlescent pigment of the present invention to paints or coatings, a coating layer with extremely excellent color and luster can be prepared.

Application Example 1

Application to Paint Spraying 4.00 g of pearlescent pigment is accurately weighed, and added to a stirrer along with 4.0 g of butyl acetate and 8.0 g of polyester automobile coating resin for stirring and dispersion for 10 min, and 84.0 g of automobile coating resin systems are further added and stirred for 5 min. Firstly, the viscosity of the coating is adjusted to a Ford cup 4 for 14-15 s before spraying; the temperature of a spraying room is controlled at 25° C. and the relative humidity is controlled at 60% during spraying; and spraying is performed twice, a varnish is applied after air drying for 10 min, and is baked at 140° C. for 30 min after performing flash drying again.

Application Example 2

Application to Injection Molding 200 g of polypropylene (PP) dried at 105° C. is accurately weighed and placed into a sealable plastic bag, 1 mL of varnish (also called dispersed oil) is added and then shaken to mix the varnish with a polypropylene material well.

4.000 g of pearl powder is weighed by using an analytical balance, and added into the sealable plastic bag, the resulting mixture was shaken again, and kneaded to sufficiently and uniformly disperse the pearl powders into PP particles.

After the barrel temperature of an extruder reaches a set value (generally 180-200° C.), the prepared polypropylene material is added into its hopper, and the original residual material in the hopper is squeezed out by virtue of rubber injection and rubber melting functions until the new material is squeezed out, wherein the new squeezed material should be glossy and free from impurities, black spots, scorches or air bubbles; and meanwhile, the nozzle should be avoided from blocking during rubber injection. After two plastic sheets to be discharged successively have no difference, the plastic sheets produced thereafter are stable and qualified products, and continuous automatic production may be initiated.

The invention claimed is:
1. A method for preparing pearlescent pigments comprising a ferric oxide ($Fe_2O_3$) coating layer or a titanium dioxide ($TiO_2$) coating layer or a $Fe_2O_3/TiO_2$ coating layer from ilmenites by using co-extraction, the method comprises the following steps:
  (1) adding hydrochloric acid and ilmenite into a reaction kettle according to a hydrochloric acid /ilmenite mass ratio of 0.5-15:1, raising the temperature to the reaction temperature T1 within a range of 30-95° C. under stirring, and then reacting at the reaction temperature T1, wherein hydrogen chloride gas is introduced during the reaction, and a resulting reaction system is kept at a pressure P higher than an atmospheric pressure; directly filtering the reaction mixture after completion of the reaction to obtain a filtrate, cooling the filtrate, and carrying out solid-liquid separation to obtain a hydrochloric acid solution A0 containing titanium-iron ions and a ferrous chloride precipitate C0, and then, optionally, directly calcining the ferrous chloride precipitate C0 obtained by centrifugation to obtain iron oxide red pigments C1, or oxidizing the precipitate C0 by using an oxidant to obtain a ferric trichloride product C2, and then dissolving the ferric trichloride product C2 in water to obtain a ferric trichloride solution III;
  (2) adding the hydrochloric acid solution A0 containing titanium-iron ions obtained in the step (1) into a co-extractor, carrying out one-stage or multistage extraction by using a co-extractant, combining the extracts as an organic phase in all stages to obtain an iron-titanium enriched extract liquid, namely an organic phase A1, wherein a remaining aqueous phase after the one-stage or multistage extraction is a high-acidity raffinate with variegated ions Mn, V and Cr and containing no iron and titanium irons, namely an aqueous phase B1;
  (3) adding the iron-titanium enriched extract liquid A1 into a titanium back extractor, back extracting titanium ions by using a titanium back extractant to obtain an organic phase A2 containing iron ions and a raffinate I as an aqueous phase containing titanium oxydichloride, referred to as a solution I containing titanium oxydichloride;
  (4) adding the organic phase A2 containing iron ions into an iron back extractor, back extracting iron with water to obtain a purified ferric trichloride solution II, and optionally, treating the ferric trichloride solution II by using an alkali precipitation method or a hydrothermal method to obtain iron oxide red pigments; and returning a remaining organic phase to the co-extractor in the step (2); and
  (5) sheet substrate coating step: coating sheet substrate raw materials or secondary sheet substrates with a ferric oxide ($Fe_2O_3$) coating layer or a titanium dioxide ($TiO_2$) coating layer or a $Fe_2O_3/TiO_2$ coating layer by using the ferric trichloride solutions II and/or III, and/or using the titanium oxydichloride solution I in the step (3).

2. The method according to claim 1, wherein the ilmenite in the step (1) are titanium concentrates, high titanium slags or modified titanium concentrates, wherein the modified ilmenite concentrate is the ilmenite concentrate subjected to oxidizing roasting and reduction roasting.

3. The method according to claim 1, wherein the pressure P in the step (1) is within the range of 0.102-2.0 MPa.

4. The method according to claim 1, wherein the hydrochloric acid/ilmenite mass ratio in the step (1) is 0.8-12:1; and/or the reaction temperature T1 in the step (1) is 40-90° C.; and/or
a reaction time in the step (1) is 2-12 h.

5. The method according to claim 1, wherein a purity of the obtained titanium oxydichloride solution I is higher than 99.7 wt %; and/or
a purity of the obtained ferric trichloride solution II or III is higher than 99.6 wt %.

6. The method according to claim 1, wherein a content of foreign metal or variegated metal in the obtained titanium oxydichloride solution I is lower than 10 ppm; and/or
a content of foreign metal in the obtained ferric trichloride solution II or III is lower than 20 ppm.

7. The method according to claim 1, wherein the co-extractant is selected from one or more of:
secondary carbon primary amine, dimethylbenzene, tributyl phosphate, di(1-methylheptyl) methyl phosphonate, trioctylphosphine oxide, trialkyl phosphine oxide, bis(2-ethylhexyl) phosphate, mono(2-ethylhexyl) phosphate, 2-ethylhexyl phosphonic acid mono(2-ethylhexyl)ester, bis(2,4,4-trimethylpentyl) phosphinic acid, methyl isobutyl ketone, sec-octyl alcohol, methylbenzene, isopentanol or sulfonated kerosene.

8. The method according to claim 1, wherein the co-extractant is selected from secondary carbon primary amine/dimethylbenzene, tributyl phosphate/dimethylbenzene and a mixture of di(1-methylheptyl)methyl phosphonate, trioctyl phosphine oxide, trialkyl phosphine oxide, bis(2-ethylhexyl) phosphate, mono(2-ethylhexyl) phosphate, 2-ethylhexyl phosphonic acid mono(2-ethylhexyl)ester or bis(2,4,4-trimethylpentyl) phosphinic acid and dimethylbenzene, methyl isobutyl ketone, sec-octyl alcohol, methylbenzene, isopentanol or sulfonated kerosene.

9. The method according to claim 1, wherein the step (5) comprises one or more of the following steps:
  (5) sheet substrate coating step, the coating step comprises the following substeps:
  substep 5.1) coating of a $Fe_2O_3$ film layer: coating the sheet substrate raw materials with the $Fe_2O_3$ film layer by using the solution II and/or III to obtain iron based pearlescent pigments "substrate+$Fe_2O_3$" having a $Fe_2O_3$ coating layer, namely pearlescent pigments (PP5a), and
  optional substep 5.2) coating of a $TiO_2$ film layer: further coating the prepared pearlescent pigments (PP5a) serving as the secondary sheet substrates with the $TiO_2$ film layer by using the titanium oxydichloride solution I in the step (3) to obtain titanium-iron based pearlescent pigments "substrate+$Fe_2O_3$+$TiO_2$" having a $Fe_2O_3$ coating layer and a $TiO_2$ coating layer, namely pearlescent pigments (PP5ab);
  (6) sheet substrate coating step, the coating step comprises the following substeps:
  substep 6.1) coating of a $TiO_2$ film layer: coating the sheet substrate raw material with the $TiO_2$ film layer by using the titanium oxydichloride solution I in the step (3) to obtain titanium based pearlescent pigments "substrate+$TiO_2$" having a $TiO_2$ coating layer, namely pearlescent pigments (PP6a), and
  optional substep6.2) coating of a $Fe_2O_3$ film layer: further coating the prepared pearlescent pigments (PP6a) serving as the secondary sheet substrates with the $Fe_2O_3$ film layer by using the solution II and/or III to obtain titanium-iron based pearlescent pigments "substrate+$TiO_2$+$Fe_2O_3$" having a $Fe_2O_3$ coating layer and a $TiO_2$ coating layer, namely pearlescent pigments (PP6ab);

(7) sheet substrate coating step, the coating step comprises the following substeps:

substep 7.1) coating of a $TiO_2/Fe_2O_3$ film layer: coating the sheet substrate raw materials with the $TiO_2/Fe_2O_3$ film layer by using a mixture formed by the solution II and/or III and the titanium oxydichloride solution I in the step (3) to obtain a titanium/iron based pearlescent pigments "substrate+$TiO_2/Fe_2O_3$" having a $TiO_2/Fe_2O_3$ coating layer, namely pearlescent pigments (PP7a), and the following two optional substeps 7.2) and 7.3):

substep 7.2) coating of a $SiO_2$ film layer: further coating the prepared pearlescent pigments (PP7a) serving as the secondary sheet substrates with the $SiO_2$ film layer by using an aqueous sodium metasilicate solution to obtain pearlescent pigments "substrate+$TiO_2/Fe_2O_3$+$SiO_2$", namely pearlescent pigments (PP7ab), and substep 7.3) coating of a $TiO_2/Fe_2O_3$ film layer: coating the prepared pearlescent pigments (PP7ab) serving as the secondary sheet substrates with the $TiO_2/Fe_2O_3$ film layer by using a mixture formed by the solution II and/or III and the titanium oxydichloride solution I in the step (3) to obtain pearlescent pigments "substrate+$TiO_2/Fe_2O_3$+$SiO_2$+$TiO_2/Fe_2O_3$" having three coating layers, namely pearlescent pigments (PP7abc);

(8) sheet substrate coating step, the coating step comprises the following substeps:

substep 8.1) coating of a $Fe_2O_3$ film layer: coating the $Fe_2O_3$ film layer on sheet substrate raw materials by using the solution II and/or III to obtain iron based pearlescent pigments "substrate+$Fe_2O_3$" with a $Fe_2O_3$ coating layer, namely pearlescent pigment (PP8a), substep 8.2) coating a $SiO_2$ film layer: further coating the $SiO_2$ film layer on the prepared pearlescent pigments (PP8a) serving as the secondary sheet substrates by using an aqueous sodium metasilicate solution to obtain pearlescent pigment "substrate+$Fe_2O_3$+$SiO_2$", namely pearlescent pigments (PP8ab), and substep 8.3) coating of a $Fe_2O_3$ film layer: coating the $Fe_2O_3$ film layer on the prepared pearlescent pigments (PP8ab) serving as the secondary sheet substrates by using the solution II and/or III to obtain pearlescent pigments "substrate+$Fe_2O_3$+$SiO_2$+$Fe_2O_3$" with three coating layers, namely pearlescent pigments (PP8abc);

(9) sheet substrate coating step, the coating step comprises the following substeps:

substep 9.1) coating of a $TiO_2$ film layer: coating the sheet substrate raw materials with the $TiO_2$ film layer by using the titanium oxydichloride solution I in the step (3) to obtain titanium based pearlescent pigments "substrate+$TiO_2$" having $TiO_2$ coating layer, namely pearlescent pigment (PP9a), substep 9.2) coating of a $SiO_2$ film layer: further coating the prepared pearlescent pigments (PP9a) serving as the secondary sheet substrates with the $SiO_2$ film layer by using an aqueous sodium metasilicate solution to obtain pearlescent pigments "substrate+$TiO_2$+$SiO_2$", namely pearlescent pigments (PP9ab), and substep 9.3) coating of a $TiO_2$ film layer: coating the prepared pearlescent pigments (PP9ab) serving as the secondary sheet substrates with the $TiO_2$ film layer by using the titanium oxydichloride solution I in the step (3) to obtain pearlescent pigments "substrate+$TiO_2$+$SiO_2$+$TiO_2$" having three coating layers, namely pearlescent pigments (PP9abc); or substep 9.3) coating of a $Fe_2O_3$ film layer: coating the prepared pearlescent pigments (PP9ab) serving as the secondary sheet substrates with the $Fe_2O_3$ film layer by using the solution II and/or III to obtain pearlescent pigments "substrate+$TiO_2$+$SiO_2$+$Fe_2O_3$" having three coating layers, namely pearlescent pigments (PP9abd); and/or

(10) sheet substrate coating step, the coating step comprises the following substeps:

substep 10.1) coating of a $SnO_2$ film layer: coating the sheet substrate raw materials with the SnO2 film layer by using an aqueous stannic chloride solution to obtain tin based pearlescent pigments "substrate+$SnO_2$" having a $SnO_2$ coating layer, namely pearlescent pigments (PP10a);

substep 10.2) coating of a $TiO_2$ film layer: coating the prepared pearlescent pigment (PP10a) serving as the secondary sheet substrates with the $TiO_2$ film layer by using the titanium oxydichloride solution I in the step (3) to obtain tin-titanium based pearlescent pigments "substrate+$SnO_2$+$TiO_2$" having a $SnO_2$ coating layer and a $TiO_2$ coating layer, namely pearlescent pigments (PP10ab), and optionally the following two substeps 10.3) and 10.4):

substep 10.3) coating of a $SiO_2$ film layer: further coating the prepared pearlescent pigments (PP10ab) serving as the secondary sheet substrates with the $SiO_2$ film layer by using an aqueous sodium metasilicate solution to obtain pearlescent pigments "substrate+$SnO_2$+$TiO_2$+$SiO_2$", namely pearlescent pigments (PP10abc), and substep 10.4) coating of a $TiO_2$ film layer: coating the prepared pearlescent pigments (PP10abc) serving as the secondary sheet substrates with the $TiO_2$ film layer by using the titanium oxydichloride solution I in the step (3) to obtain pearlescent pigments "substrate+$SnO_2$+$TiO_2$+$SiO_2$+$TiO_2$" having four coating layers, namely pearlescent pigments (PP10abcd), or substep 10.4) coating of a $SnO_2$ film layer and a $TiO_2$ film layer: 10.4.1) firstly, coating the prepared pearlescent pigments (PP10abc) serving as the secondary sheet substrates with the $SnO_2$ film layer by using an aqueous stannic chloride solution to obtain pearlescent pigments "substrate+$SnO_2$+$TiO_2$+$SiO_2$+$SnO_2$" having a $SnO_2$ coating layer, namely pearlescent pigments (PP10abce), 10.4.2) and then, coating the pearlescent pigments (PP10abce) as the secondary sheet substrates prepared in 10.4.1) with the $TiO_2$ film layer by using the titanium oxydichloride solution I in the step (3) to obtain pearlescent pigments "substrate+$SnO_2$+$TiO_2$+$SiO_2$+$SnO_2$+$TiO_2$" having five coating layers, namely pearlescent pigments (PP10abcef).

10. The method according to claim 9, wherein the substep 5.1) is performed as follows: adding water into the sheet substrates for beating and stirring to obtain a slurry having an initial solid content ranging from 3 wt % to 25 wt %, raising the temperature to an elevated temperature T3, adjusting the pH value of the slurry to be within the range of 1-5, adding the ferric trichloride solution II and/or III into the slurry at a certain feed rate, meanwhile, adding an alkali solution to keep the pH value constant, and reacting for a period of time to obtain sheet substrate/ $Fe_2O_3$ pearlescent pigments; and/or the substep 6.1) is performed as follows: adding water into the sheet substrates for beating and stirring to obtain a slurry having an initial solid content ranging from 3 wt % to 25 wt %, raising the temperature to an elevated temperature T2, adjusting the pH value of the slurry to be within the range of 1-4, adding the titanium oxydichloride solution I prepared in the step (3) into the slurry at a certain feed rate, meanwhile, adding an alkali solution to keep the pH value constant, and reacting for a period of time to obtain sheet substrate/TiO2 pearlescent pigments.

11. The method according to claim 1, characterized in that the mass ratio of the extractant to the hydrochloric acid solution A0 containing titanium-iron ions in the step (2) is 1-6:1.

12. The method according to claim 1, characterized in that the titanium back extractant in the step (3) is selected from one or two of deionized water or dilute acid.

13. The method according to claim 1, characterized in that the mass ratio of the titanium back extractant to the titanium-iron enriched extract liquid A1 in the step (3) is 3-12:1.

14. The method according to claim 1, the sheet substrate raw materials in the step (5) or (6) are natural mica, synthetic mica, glass sheets, flaky alumina, flaky silica, and various kinds of flaky metal.

15. The method according to claim 1, wherein the ilmenite in the step (1) are titanium concentrates, high titanium slags or modified titanium concentrates containing 30-80 wt % of titanium dioxide.

16. The method according to claim 1, characterized in that the titanium back extractant in the step (3) is selected from dilute hydrochloric acid having a concentration of 0.5-10 wt %.

\* \* \* \* \*